(12) United States Patent
Wang et al.

(10) Patent No.: US 9,680,283 B2
(45) Date of Patent: Jun. 13, 2017

(54) SWITCHABLE-GAIN OPTICAL AMPLIFIER

(71) Applicant: Oplink Communications, LLC, Fremont, CA (US)

(72) Inventors: Chiachi Wang, Union City, CA (US); Lifu Gong, San Jose, CA (US); Lijie Qiao, Ottawa (CA); Weihua Guan, Newark, CA (US)

(73) Assignee: Oplink Communications, LLC, Fremont, CA (US)

( * ) Notice: Subject to any disclaimer, the term of this patent is extended or adjusted under 35 U.S.C. 154(b) by 0 days.

(21) Appl. No.: 14/137,261

(22) Filed: Dec. 20, 2013

(65) Prior Publication Data
US 2015/0180196 A1 Jun. 25, 2015

(51) Int. Cl.
| | |
|---|---|
| H01S 3/067 | (2006.01) |
| H01S 3/10 | (2006.01) |
| G02B 6/35 | (2006.01) |
| H04B 10/294 | (2013.01) |

(52) U.S. Cl.
CPC ...... *H01S 3/10015* (2013.01); *H01S 3/06754* (2013.01); *H04B 10/2941* (2013.01); *G02B 6/35* (2013.01); *H01S 3/06758* (2013.01); *H01S 2301/04* (2013.01)

(58) Field of Classification Search
CPC .. H01S 3/06758; H01S 5/0064; H01S 5/0085; G02B 6/35; G02B 2006/12145
See application file for complete search history.

(56) References Cited

U.S. PATENT DOCUMENTS

| | | | | |
|---|---|---|---|---|
| 6,236,498 | B1 * | 5/2001 | Freeman | H01S 3/094003 359/337.1 |
| 6,307,668 | B1 * | 10/2001 | Bastien et al. | 359/337.1 |
| 6,437,907 | B1 * | 8/2002 | Yoon et al. | 359/341.32 |
| 6,671,085 | B2 * | 12/2003 | So et al. | 359/341.42 |
| 7,023,612 | B2 | 4/2006 | Ghera et al. | |
| 7,104,700 | B2 | 9/2006 | Hwan et al. | |
| 7,609,437 | B2 * | 10/2009 | Seki | 359/337.1 |
| 8,089,690 | B2 | 1/2012 | Rapp | |

(Continued)

FOREIGN PATENT DOCUMENTS

| | | |
|---|---|---|
| GB | 2 420 005 | 5/2006 |
| JP | 2003-046174 A | 2/2003 |

(Continued)

OTHER PUBLICATIONS

Communication Pursuant to Article 94(3) EPC received in European Patent Application No. 14 197 295.0, filed Dec. 11, 2014. Received May 20, 2015. 5 pages.

*Primary Examiner* — Eric Bolda
(74) *Attorney, Agent, or Firm* — Jeffrey K. Jacobs

(57) ABSTRACT

Methods, systems, and apparatus, including computer programs encoded on computer storage media, for optical communications. One optical amplifier includes an input port; a bar-cross switch optically coupled to the input port; a first gain stage optically coupled between first port of the bar-cross switch and to an output port; and a secondary gain stage optically coupled between a second port and a third port of the bar-cross switch, wherein in a bar-state of the bar-cross switch the secondary gain stage is bypassed and in a cross-state, the secondary gain stage and the first gain stage are applied to an input light beam.

18 Claims, 4 Drawing Sheets

(56) References Cited

U.S. PATENT DOCUMENTS

| | | |
|---|---|---|
| 8,294,981 B2 | 10/2012 | Lin et al. |
| 2001/0033411 A1* | 10/2001 | Shiota et al. ................. 359/333 |
| 2002/0001124 A1* | 1/2002 | Kinoshita ........... H01S 3/06754 |
| | | 359/337.1 |
| 2004/0001248 A1* | 1/2004 | Grubb et al. ................. 359/333 |
| 2004/0196539 A1 | 10/2004 | Chang et al. |
| 2011/0085231 A1 | 4/2011 | Bolshtyansky et al. |
| 2013/0156417 A1* | 6/2013 | Chou et al. ....................... 398/5 |
| 2015/0180196 A1 | 6/2015 | Wang et al. |

FOREIGN PATENT DOCUMENTS

| | | |
|---|---|---|
| JP | 2009-272570 A | 11/2009 |
| JP | 2011-243803 A | 12/2011 |

\* cited by examiner

SWITCHABLE-GAIN OPTICAL AMPLIFIER

BACKGROUND

This specification relates to optical communications.

Conventional optical communications systems typically include optical amplifiers to provide enough optical power along the fiber links. Typically, optical amplifiers demonstrate amplified spontaneous emission (ASE) noise, which can be described by a noise figure (NF) value that measures a change in signal-to-noise ratio between an input and an output. To maintain a high enough optical signal-to-noise ratio (OSNR) at a receiver end, a high gain and a low noise figure are desired.

SUMMARY

In general, one innovative aspect of the subject matter described in this specification can be embodied in optical amplifiers that include an input port; a bar-cross switch optically coupled to the input port; a first gain stage optically coupled between first port of the bar-cross switch and to an output port; and a secondary gain stage optically coupled between a second port and a third port of the bar-cross switch, wherein in a bar-state of the bar-cross switch the secondary gain stage is bypassed and in a cross-state, the secondary gain stage and the first gain stage are applied to an input light beam.

The foregoing and other embodiments can each optionally include one or more of the following features, alone or in combination. The secondary gain stage includes a gain flattening filter and a rare-earth doped fiber. The first gain stage includes a gain-flattening filter and a rare-earth doped fiber. The optical amplifier further includes a controller, wherein the controller controls the state of the bar-cross switch. The secondary gain stage includes a plurality of cascading gain stages, each comprising a separate gain-flattening filter and rare-earth doped fiber. Each of the cascading gain stages includes a pump source. One or more of the cascading gain stages uses remnant pump light from a previous stage. The bar-cross switch is configured to pass both pump light and optical signals such that remnant pump light can be used to pump a rare-earth doped fiber of a subsequent gain stage. The amplifier can be applied to S band, C band, and L band optical signals.

The first gain stage and the secondary gain stage are configured to provide a flat gain over a large gain range. The secondary gain stage further comprises a pump-bypass structure including an isolator, pump wavelength WDMs, and a by-pass insertion loss point. The optical amplifier further includes one or more additional bar-cross switches serially coupled between a first port of the bar-cross switch and the first gain stage, and wherein each of the one or more additional bar-cross switches is coupled to a corresponding secondary gain stage. The optical amplifier further includes an input photodiode for detecting an input signal power; an output photodiode for detecting an output signal power; and electrical communications lines for providing measurements of the input photodiode and the output photodiode to a controller.

In general, one innovative aspect of the subject matter described in this specification can be embodied in optical amplifiers that include an input port; a wavelength division multiplexing fiber coupled to a pump source and to a bar-cross switch; a first gain stage optically coupled between first port of the bar-cross switch and to an output port, the first gain stage including a first gain flattening filter; and a secondary gain stage optically coupled between a second port and a third port of the bar-cross switch, the secondary gain stage including a second gain flattening filter, wherein in a bar-state of the bar-cross switch the secondary gain stage is bypassed and in a cross-state, the secondary gain stage and the first gain stage are applied to an input light beam.

Particular embodiments of the subject matter described in this specification can be implemented so as to realize one or more of the following advantages. A switchable-gain amplifier is provided that maintains a low noise figure over a large gain range. A single 2×2 bar-cross switch is used to achieve the switchable gain in contrast to conventional system that use a pair of 1×N or N×1 switches. Similarly, the use of the single 2×2 bar-cross switch avoids the need for switchable filters to provide a gain switch function.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In optical communication networks, wavelength routing and topology change are often necessary. In these scenarios, large gain ranges for optical amplifiers are needed. To maintain a low noise figure throughout the gain range, a switchable-gain amplifier configuration is described in this specification. The switchable-gain amplifier uses a 2×2 bar-cross switch for amplification applications in optical network environments.

Figure 1:
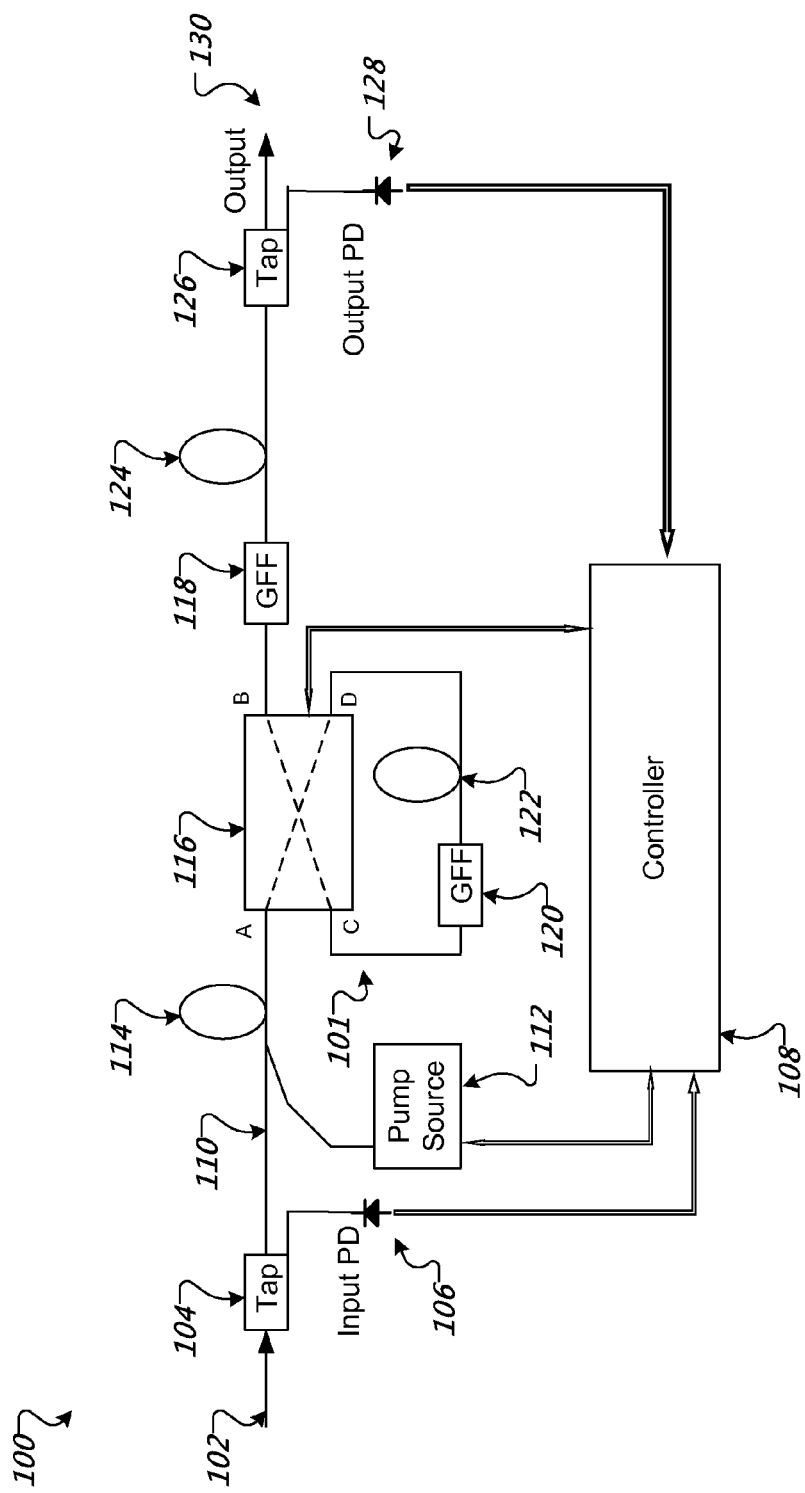
FIG. 1 is a diagram of an example optical amplifier.

FIG. 1 is a diagram of an example optical amplifier 100. The optical amplifier includes an input optical fiber 102 leading to an input tap coupler 104. An input light beam having one or more signal wavelengths can be input through the input optical fiber 102. The input tap coupler 104 is configured to separate out a small portion of an input light beam, e.g., between 1% and 5%, and direct the tapped light beam to an input photodiode 106. The input photodiode 106 measures input power of the light beam and provides it as an input to a controller 108.

The majority of the light beam exits the first tap coupler 104 and is optically coupled to a pump wavelength division multiplexer fiber 110. The pump wavelength division multiplexer 110 combines the light beam with a pump light entering from a pump source 112. The pump source 112 is controlled by the controller 108. In some implementations, the pump source 112 emits a light beam having a wavelength of 980 nm. In some other implementations, the pump source 112 emits a light beam having a wavelength of 1480 nm.

In some implementations, the input light signal and the pump light are multiplexed at a combiner component. The multiplexed light beam passes through a first rare-earth doped fiber 114, for example, an erbium doped fiber. The first rare-earth doped fiber 114 absorbs pump light to provide light amplification through stimulated emission, resulting in a gain to the input light beam.

The first rare-earth doped fiber 114 is optically coupled to a bar-cross switch 116. The bar-cross switch 116 includes four ports, A, B, C, and D. Port A is optically coupled to the first rare-earth doped fiber 114. Port B is optically coupled to a first gain flattening filter (GFF) 118. The gain provided by a fiber amplifier can have a degree of wavelength dependence such that some wavelengths are amplified more than other wavelengths. A gain flattening filter provides gain equalization between signal wavelengths of the light beam. The gain flattening filter can use, for example, fiber Bragg gratings.

Port C is optically coupled to a Port D and to a secondary gain stage 101. In particular, the secondary gain stage 101 includes a second GFF 120 and a second rare-earth doped fiber 122, positioned along a fiber path between Port C and Port D. A state of the bar-cross switch 116 is controlled by the controller 108, which is described in greater detail with respect to FIGS. 2A and 2B.

The first GFF 118 is optically coupled between the bar-cross switch 116 and a third rare-earth doped fiber 124. The third rare-earth doped fiber 124 is optically coupled to a second tap coupler 126. The second tap coupler 126 is configured to separate a portion of an input light beam, e.g., 1% to 5%, and direct the tapped light beam to an output photodiode 128. The output photodiode 128 measures output power of the light beam and provides it as an input to a controller 108. The controller 108 can use the measurements of the input light beam power and the output light beam power to control, for example, one or more pump sources as well as the switch state of the bar-cross switch 116.

The majority of the light beam exits the second tap coupler 126 and is optically coupled to an output optical fiber 130. Thus, an amplified output light beam exits the optical amplifier 100 though the optical fiber 130. However, the amount of gain of the output light beam as compared to the input light beam can be variable as described below.

Figure 2A:
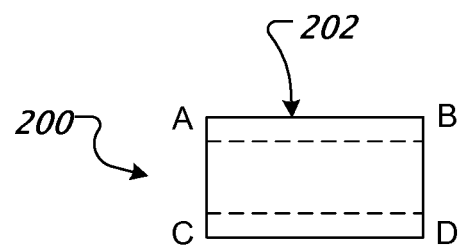
FIGS. 2A and 2B are diagrams of switch states of a 2×2 bar-cross switch.
Figure 2B:
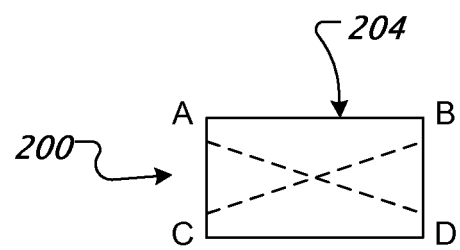

FIGS. 2A and 2B are diagrams of switch states of a 2×2 bar-cross switch 200. In particular, FIG. 2A shows the bar-cross switch 200 in a bar state 202. In the bar state 202, optical light input at Port A is transmitted from Port A to Port B directly. Additionally, Port C is optically coupled to Port D. However, none of the signal light passes between port C and Port D.

FIG. 2B shows the bar-cross switch 200 in a cross state 204. In the cross state 204, optical light input at Port A is transmitted from Port A to Port D. Additionally, optical light input at Port C is transmitted to Port B. The change from bar state 202 to cross state 204 is controlled by an electrical signal received from a microcontroller, for example, the controller 108 of FIG. 1.

Returning to the optical amplifier 100 of FIG. 1, when the bar-cross switch 116 is in a bar-state, a secondary gain stage optically coupled to ports C and D is bypassed. The first GFF 118 provides a shaped, typically flattened, gain spectrum while the secondary gain stage is bypassed. A smaller degree of amplification is applied to the input light beam by the first rare-earth doped fiber 114 and the third rare-earth doped fiber 124.

When the bar-cross switch 116 is in a cross-state, the secondary gain stage is included in the optical path to provide additional optical gain. As noted above, the secondary gain stage includes the second GFF 120 and the second rare-earth doped fiber 122. The second GFF 120 provides a shaped, typically flattened, gain spectrum for the secondary gain stage.

Consequently, the use of the first GFF 118 and the second GFF 120 allows for a flat gain spectrum over a large gain range. In the bar-state, only the first GFF 118 is used to provide the flat output in situation in which the optical amplifier 100 provides a relatively small gain. In the cross state, the secondary gain stage including the second GFF 120 is applied such that the two GFF's are combined to provide a shaped, typically flattened, gain spectrum with a relatively large overall gain.

In some implementations, the optical amplifier 100 can use the same pump source 112 to provide pump power to both the first rare-earth doped fiber 114 and the second rare-earth doped fiber 122. In particular, the bar-cross switch 116 can work in both the pump and signal wavelengths allowing the co-propagation of the signal and the pump light though the bar-state or the cross-state. Thus, when the bar-cross switch 116 is in the cross state, the remnant pump light from the first rare-earth doped fiber 114 is guided to the secondary gain stage to the second rare-earth doped fiber 122 to provide additional gain without additional pump sources. Similarly, when the bar-cross switch 116 is in the bar state, the remnant pump light from the first rare-earth doped fiber 114 is guided to the third rare-earth doped fiber 124. The insertion loss for the bar-cross switch 116 can be optimized for both the pump light and the signal light beams. Alternatively, in some implementations, separate pump sources can be used to provide pump light to each respective rare-earth doped fiber.

In some implementations, the secondary gain stage can include multiple serial gain stages. Each of these gain stages can include respective GFF and rare-earth doped fiber. In some cases, each gain stage includes a separate pump source. In some other cases, the gain stages use the remnant pump light of the previous stage. The first gain stage can include a pump source or can use the remnant pump light of the pump source 112, as described above.

Moreover, in some implementations, serial secondary gain stages can be included. Each secondary gain stage can be serially linked by respective bar-cross switches for each secondary gain stage. Thus, based on the example shown in FIG. 1, the bar-cross switch 116 is serially coupled to a second bar-cross switch and having a corresponding secondary gain stage. This second bar-cross switch can be serially coupled to a third bar-cross switch and secondary gain stage, and so on. This allows for greater flexibility and control of the gain range applied to an input optical signal.

Figure 3:
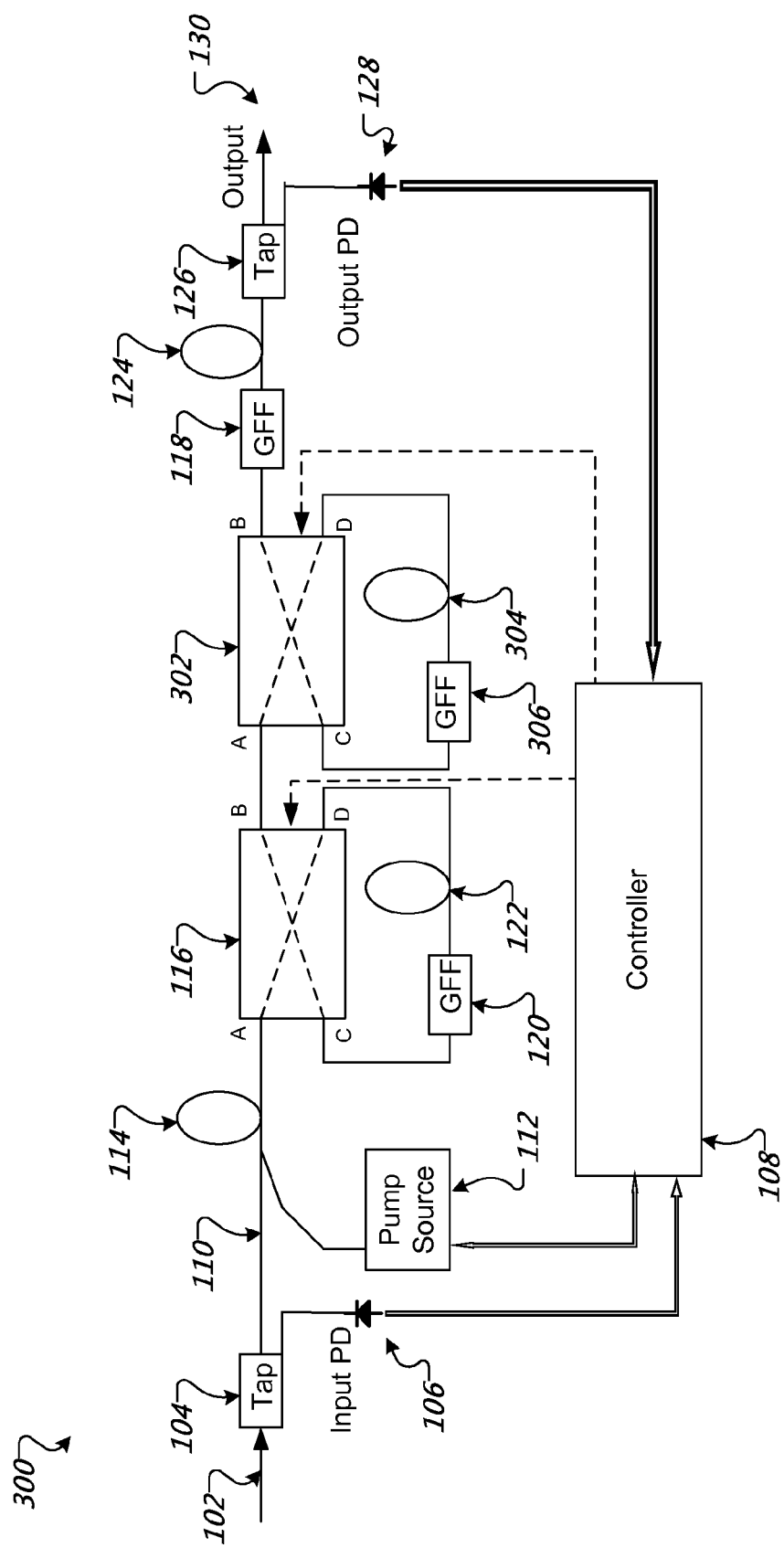
FIG. 3 is a diagram of an example optical amplifier with serial bar-cross switches.

FIG. 3 is a diagram of an example optical amplifier 300 with serial bar-cross switches. The optical amplifier 300 is similar to the optical amplifier 100 of FIG. 1. However, in this example, Port B of the bar-cross switch 116 is coupled to an input at Port A of a second bar-cross switch 302. The bar-cross switch 302 is coupled to a second secondary gain stage in a similar manner to the bar-cross switch 116. The second secondary gain stage includes a fourth rare-earth doped fiber 304 and a fourth GFF 306. The output port B of the second bar cross-switch 302 is optically coupled to the first GFF 118. Although only a second bar-cross switch is shown, any suitable number of similar switches and secondary gain stages can be cascaded serially between the first bar-cross switch 116 and the first GFF 118. In some implementations, a rare-earth doped fiber is coupled between each bar-cross switch.

Figure 4:
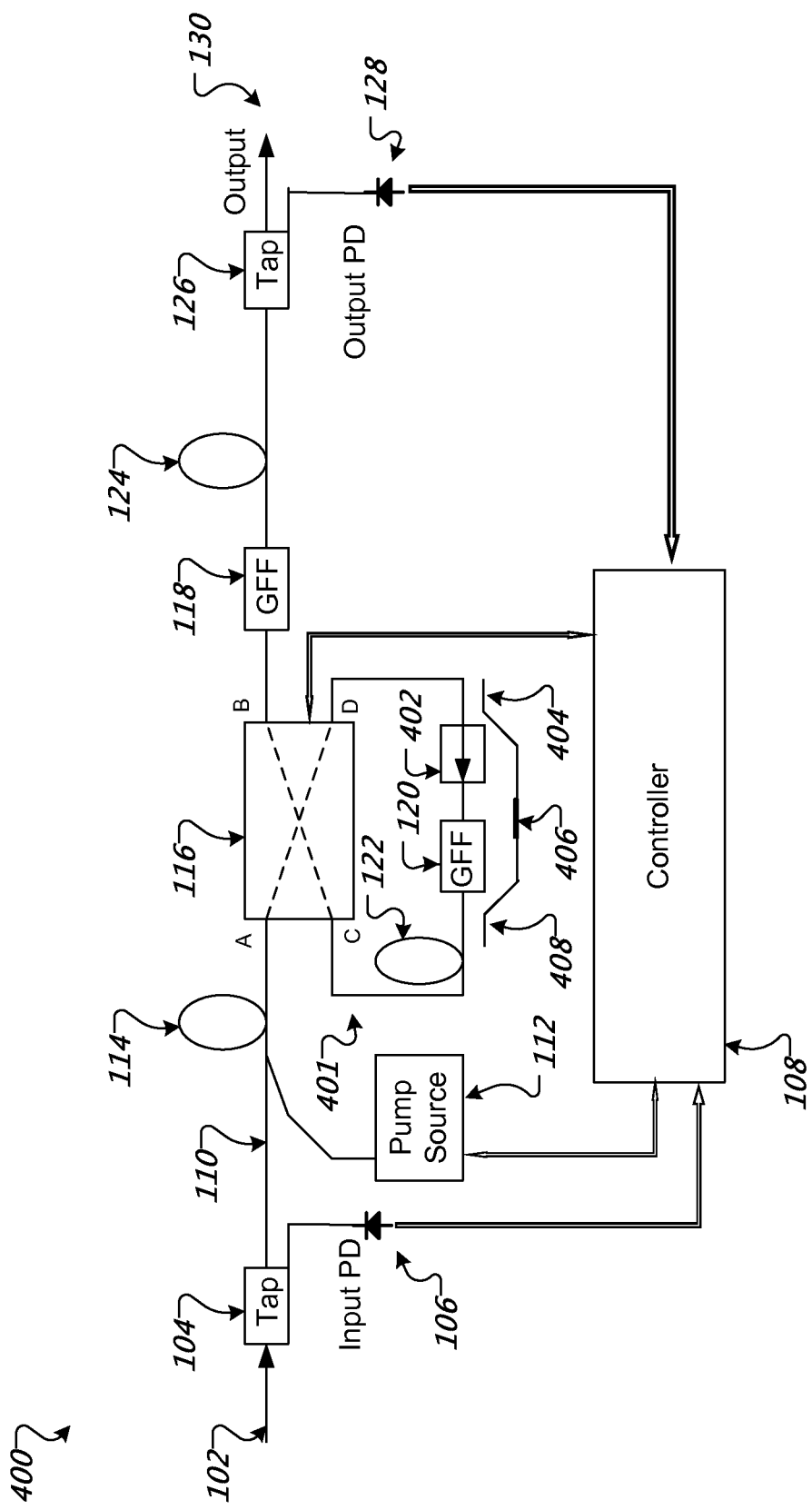
FIG. 4 is a diagram of an example optical amplifier including a pump bypass structure.

FIG. 4 is a diagram of an example optical amplifier 400 including a pump bypass structure. The optical amplifier 400 is similar to the optical amplifier 100 of FIG. 1. However, the secondary gain stage of the optical amplifier 400 has been modified. In particular, the secondary gain stage 401 includes an isolator 402 coupled to the Port D, the second GFF 120, and the second rare-earth doped fiber 122. In particular, in the optical amplifier 400, the second GFF 120 is optically coupled between the isolator 402 and the second rare-earth doped fiber 122. The secondary gain stage 401 also includes pump wavelength WDMs 404 and 408 and by-pass insertion loss point 406. The isolator 402, pump wavelength WDMs 404 and 408 and by-pass insertion loss point 406 for the pump by-pass structure. The pump by-pass structure helps suppress spontaneous emission noise (ASE).

The optical amplifier 100 can be used in various amplification applications. In addition, the optical amplifier 100 can be used to provide amplification for various signal wavelengths including C band, S band, and L band signals.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An optical amplifier comprising:
    an input port;
    a bar-cross switch optically coupled to the input port;
    a first gain stage optically coupled between a first port of the bar-cross switch and an output port; and
    a secondary gain stage optically coupled between a second port and a third port of the bar-cross switch, wherein the secondary gain stage comprises a pump bypass structure coupled around an isolator and including a first pump wavelength WDM;
    wherein in a bar-state of the bar-cross switch the secondary gain stage is bypassed and in a cross-state, the secondary gain stage and the first gain stage are applied to an input light beam,
    wherein the secondary gain stage comprises a plurality of cascading gain stages, each comprising a separate gain-flattening filter and rare-earth doped fiber, and
    wherein one or more of the cascading gain stages uses remnant pump light from a previous stage.

2. The optical amplifier of claim 1, wherein the secondary gain stage comprises a gain-flattening filter and a rare-earth doped fiber.

3. The optical amplifier of claim 1, wherein the first gain stage comprises a gain-flattening filter and a rare-earth doped fiber.

4. The optical amplifier of claim 1, further comprising a controller, wherein the controller controls the state of the bar-cross switch.

5. The optical amplifier of claim 1, wherein each of the cascading gain stages includes a pump source.

6. An optical amplifier comprising:
    an input port;
    a bar-cross switch optically coupled to the input port;
    a first gain stage optically coupled between a first port of the bar-cross switch and an output port; and
    a secondary gain stage optically coupled between a second port and a third port of the bar-cross switch, wherein the secondary gain stage comprises a pump bypass structure coupled around an isolator and including a first pump wavelength WDM;
    wherein in a bar-state of the bar-cross switch the secondary gain stage is bypassed and in a cross-state, the secondary gain stage and the first gain stage are applied to an input light beam,
    wherein the bar-cross switch is configured to pass both pump light and optical signals such that remnant pump light can be used to pump a rare-earth doped fiber of a subsequent gain stage.

7. The optical amplifier of claim 1, wherein the amplifier can be applied to S band, C band, and L band optical signals.

8. The optical amplifier of claim 1, wherein the first gain stage and the secondary gain stage are configured to provide a flat gain over a large gain range.

9. The optical amplifier of claim 1, wherein the secondary gain stage further comprises a pump-bypass structure including an isolator, pump wavelength WDMs, and a by-pass insertion loss point.

10. The optical amplifier of claim 1, further comprising one or more additional bar-cross switches serially coupled between a first port of the bar-cross switch and the first gain stage, and wherein each of the one or more additional bar-cross switches is coupled to a corresponding secondary gain stage.

11. The optical amplifier of claim 1, further comprising:
    an input photodiode for detecting an input signal power;
    an output photodiode for detecting an output signal power; and
    electrical communications lines for providing measurements of the input photodiode and the output photodiode to a controller.

12. An optical amplifier, comprising:
    an input port;
    a wavelength division multiplexing fiber coupled to the input port, a pump source, and to a first port of a first bar-cross switch;
    the first bar-cross switch configured to selectively couple a first gain stage based on whether the first bar-cross switch is positioned in a bar-state or a cross-state, the first gain stage including a first gain flattening filter and a first erbium doped optical fiber; and a second bar-cross switch coupled to an output port of the first bar-cross switch and to an output port of the optical amplifier, wherein the second bar-cross switch is configured to selectively couple a secondary gain stage based on whether the second bar-cross switch is positioned in a bar-state or a cross-state, the secondary gain stage including a second gain flattening filter and a second erbium doped optical fiber, wherein the respective states of the first bar-cross switch and the second bar-cross switch are selected to provide a particular output gain for the optical amplifier.

13. The optical amplifier of claim 6, wherein the secondary gain stage comprises a gain-flattening filter and a rare-earth doped fiber.

14. The optical amplifier of claim 6, wherein the first gain stage comprises a gain-flattening filter and a rare-earth doped fiber.

15. The optical amplifier of claim 6, further comprising a controller, wherein the controller controls the state of the bar-cross switch.

16. The optical amplifier of claim 6, wherein the secondary gain stage comprises a plurality of cascading gain stages and wherein each of the cascading gain stages includes a pump source.

17. The optical amplifier of claim 6, wherein the amplifier can be applied to S band, C band, and L band optical signals.

18. The optical amplifier of claim 6, further comprising:

an input photodiode for detecting an input signal power;

an output photodiode for detecting an output signal power; and electrical communications lines for providing measurements of the input photodiode and the output photodiode to a controller.

* * * * *